United States Patent
Harper et al.

(10) Patent No.: US 9,709,434 B1
(45) Date of Patent: Jul. 18, 2017

(54) LEVEL INDICATOR SYSTEM

(71) Applicant: JOGLER, LLC, Baton Rouge, LA (US)

(72) Inventors: Brandon Harper, Baton Rouge, LA (US); David Allen, Baton Rouge, LA (US)

(73) Assignee: Jogler, LLC, Baton Rouge, LA (US)

( * ) Notice: Subject to any disclaimer, the term of this patent is extended or adjusted under 35 U.S.C. 154(b) by 196 days.

(21) Appl. No.: 14/608,420

(22) Filed: Jan. 29, 2015

(51) Int. Cl.
*G01F 23/38* (2006.01)
*G01F 23/66* (2006.01)
*G01F 23/72* (2006.01)

(52) U.S. Cl.
CPC .............. *G01F 23/38* (2013.01); *G01F 23/66* (2013.01); *G01F 23/72* (2013.01)

(58) Field of Classification Search
CPC .......... G01F 23/02; G01F 23/38; G01F 23/66; G01F 23/72; G01F 23/74
USPC ........ 116/109, 110, 111, 204, 227, 228, 229, 116/267, 272, 273, 276; 73/305, 319, 73/323, DIG. 5
See application file for complete search history.

(56) References Cited

U.S. PATENT DOCUMENTS

| | | | | |
|---|---|---|---|---|
| 809,471 A * | 1/1906 | Seabury | ................... | G01F 23/02 116/276 |
| 2,620,663 A * | 12/1952 | Fine | ...................... | F25B 41/006 220/2.3 R |
| 2,706,463 A * | 4/1955 | Dune | ....................... | G01L 19/12 116/272 |
| 2,707,396 A * | 5/1955 | Dupure | ................... | G01F 23/02 116/276 |
| 2,833,148 A * | 5/1958 | Hoyt | ....................... | G01F 23/02 73/323 |
| 2,934,953 A * | 5/1960 | Anderson | ............... | G01F 23/66 73/319 |
| 3,585,963 A * | 6/1971 | Hiszpanski | ........... | G01P 13/008 116/206 |
| 3,837,226 A * | 9/1974 | Kawawa | .................. | B01J 3/004 220/663 |
| 3,964,312 A * | 6/1976 | Sebek | ...................... | G01F 23/66 73/307 |
| 4,194,397 A * | 3/1980 | Yasuda | ................... | G01F 23/66 73/314 |
| 4,345,468 A * | 8/1982 | Jackson | .................. | G01F 23/02 62/85 |
| 4,457,171 A * | 7/1984 | Gebauer | ................. | G01F 23/72 73/305 |
| 4,512,190 A | 4/1985 | Sledmere | | |
| 4,809,862 A * | 3/1989 | Canty | ..................... | G02B 7/007 116/276 |
| 5,323,653 A * | 6/1994 | Gruett | ..................... | G01K 13/02 374/E13.006 |
| 5,383,338 A * | 1/1995 | Bowsky | ................ | F25B 41/006 116/206 |

(Continued)

*Primary Examiner* — R. A. Smith
(74) *Attorney, Agent, or Firm* — Roy Kiesel Ford Doody & Thurmon

(57) ABSTRACT

A plug for a level indicator system and a level indicator system. The level indicator system includes an elongated level indicator tube sealed by one or more of the plugs, and a magnetically operated visual indicator secured within the elongated level indicator tube. The plug includes an elongated body having a first end, a second end; and port. The plug is configured to form a seal with the level indicator tube.

40 Claims, 11 Drawing Sheets

(56) References Cited

U.S. PATENT DOCUMENTS

| | | | | |
|---|---|---|---|---|
| 5,988,701 A * | 11/1999 | Wu | ............... | G01F 23/74 |
| | | | | 285/197 |
| 6,234,018 B1 * | 5/2001 | Kelada | ............... | F16K 17/26 |
| | | | | 73/323 |
| 6,435,026 B1 | 8/2002 | Donehue | | |
| 6,532,815 B2 * | 3/2003 | Wech | ............... | G01F 23/02 |
| | | | | 73/323 |
| 6,588,272 B2 * | 7/2003 | Mulrooney | ............... | G01F 23/263 |
| | | | | 116/204 |
| 2012/0034403 A1 * | 2/2012 | Paterek | ............... | C03C 27/046 |
| | | | | 428/34.4 |
| 2012/0324996 A1 * | 12/2012 | Taylor | ............... | G01F 23/02 |
| | | | | 73/313 |
| 2015/0253179 A1 * | 9/2015 | Carlson | ............... | G01F 23/72 |
| | | | | 116/204 |

* cited by examiner

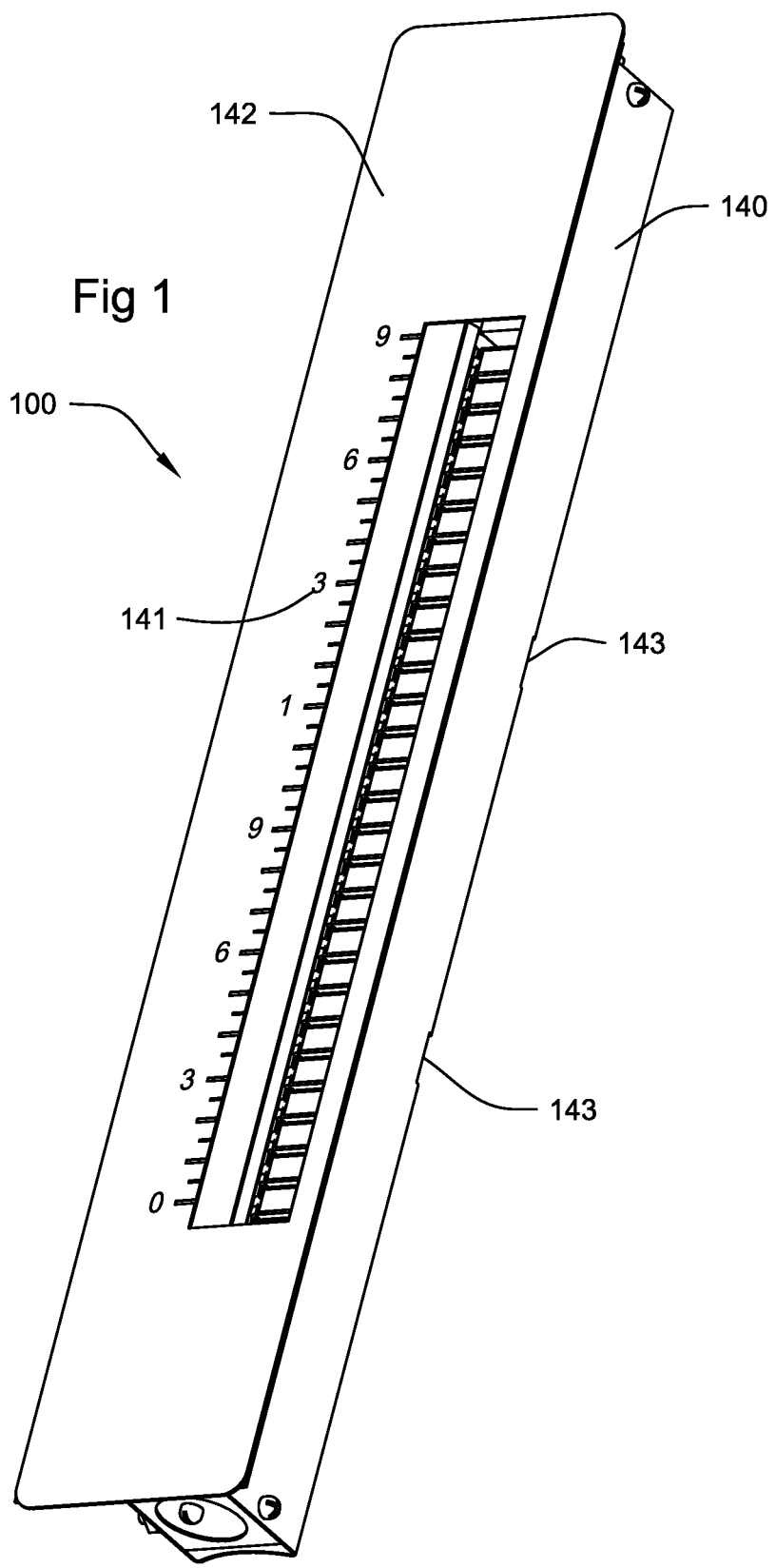

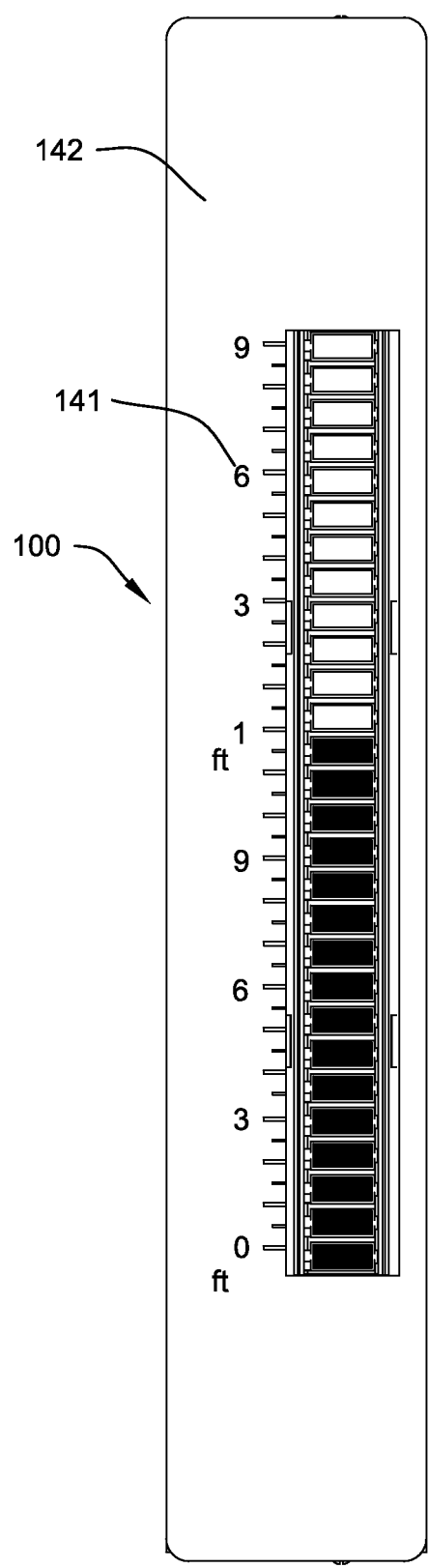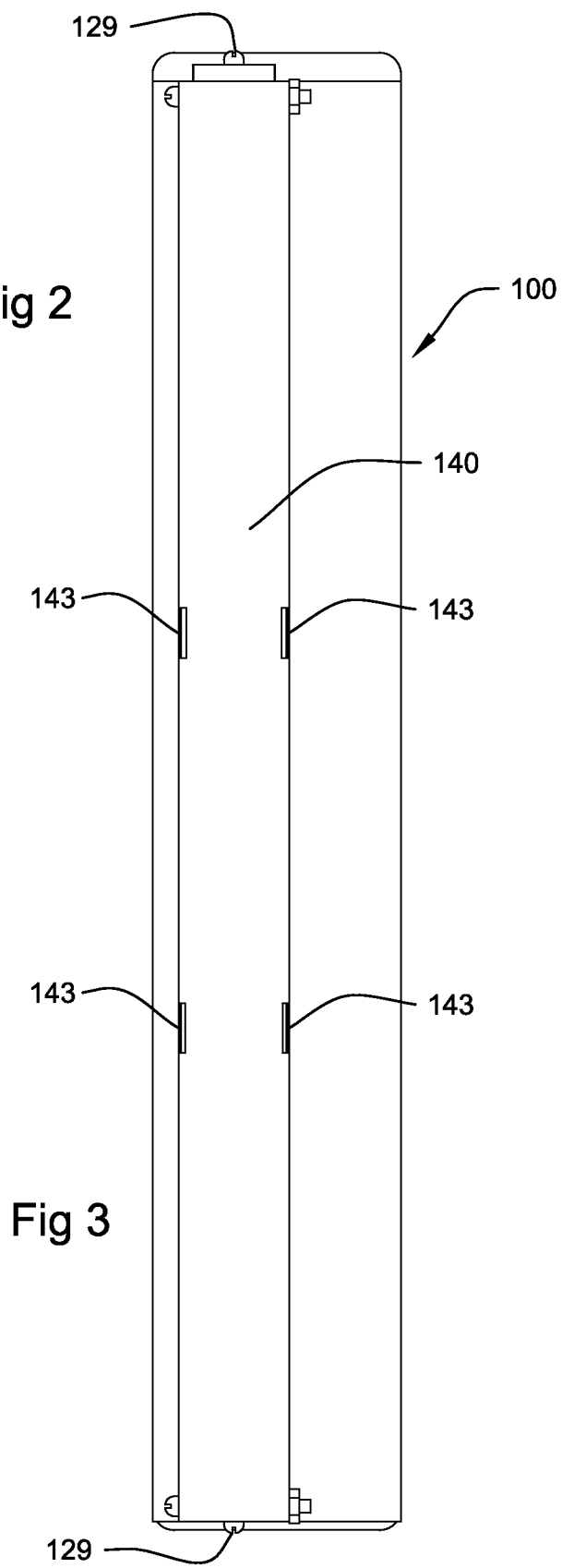

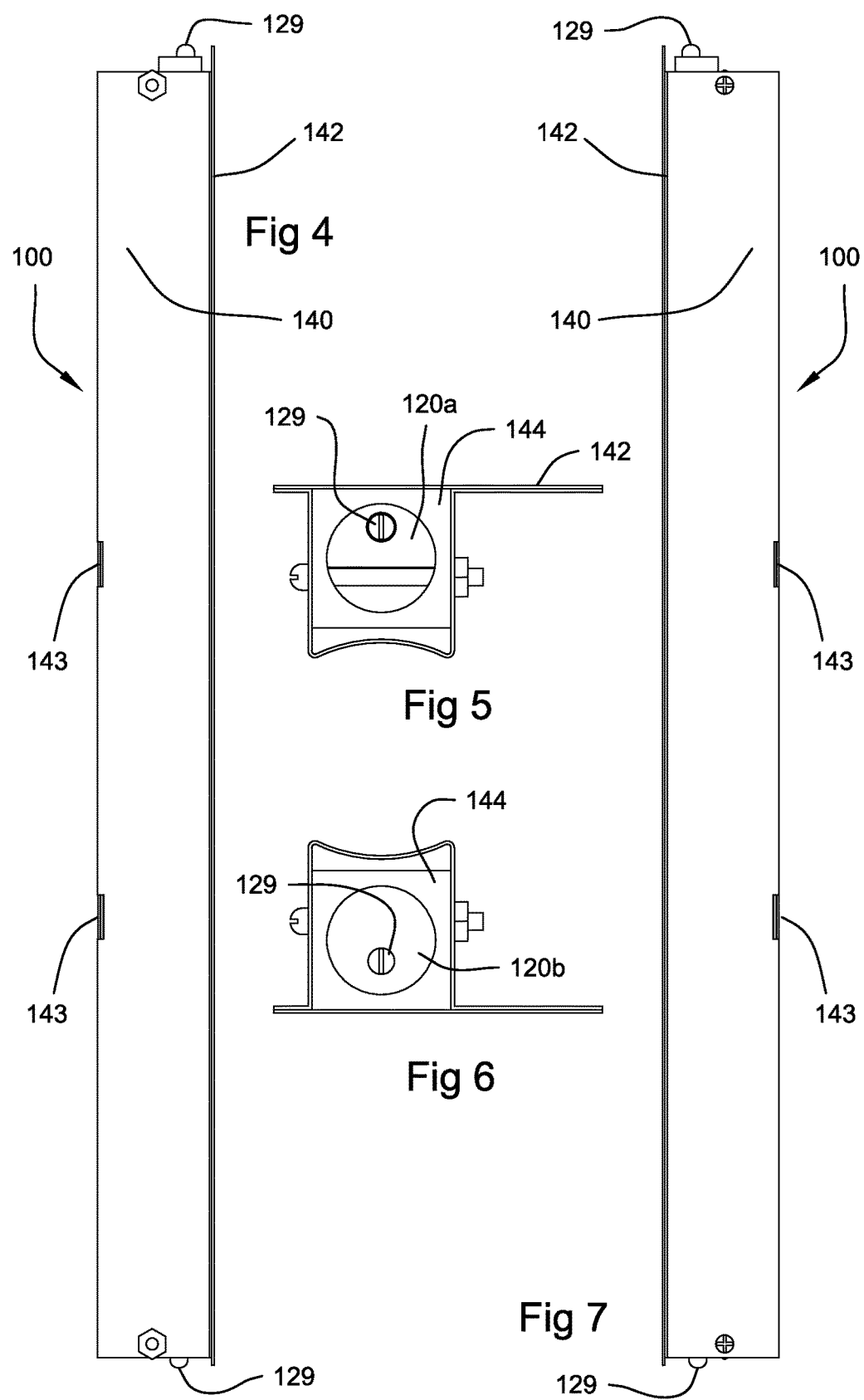

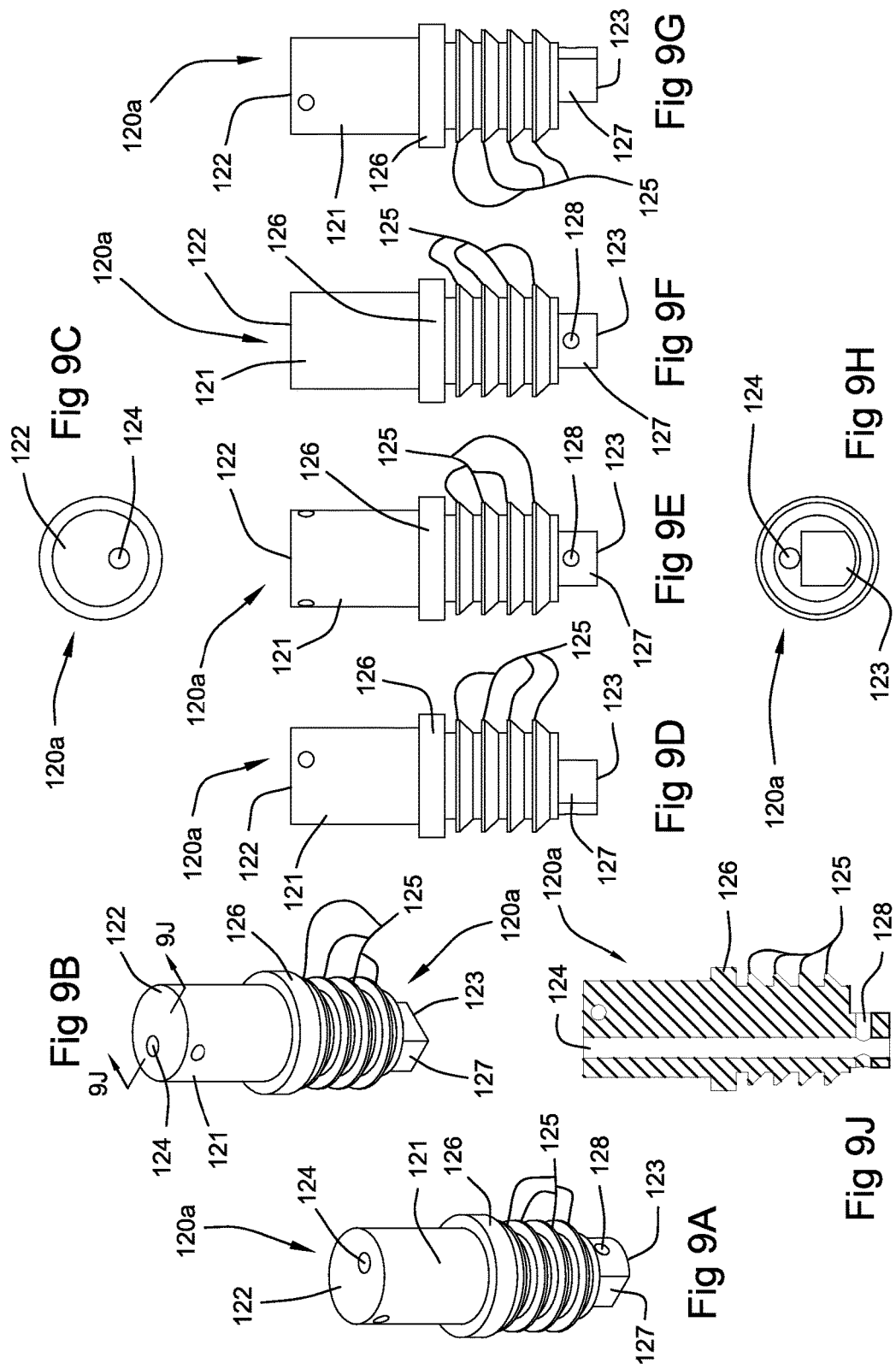

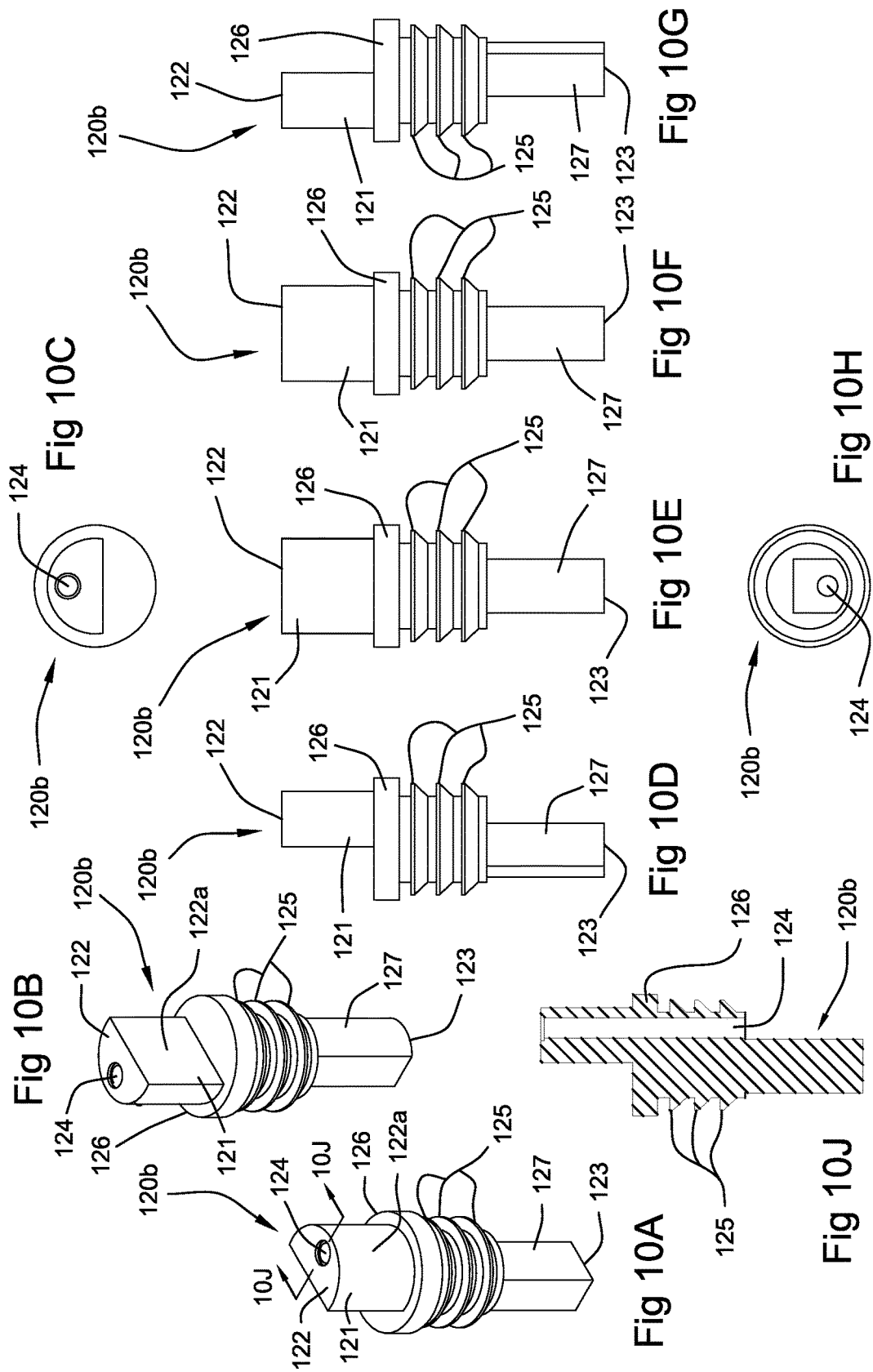

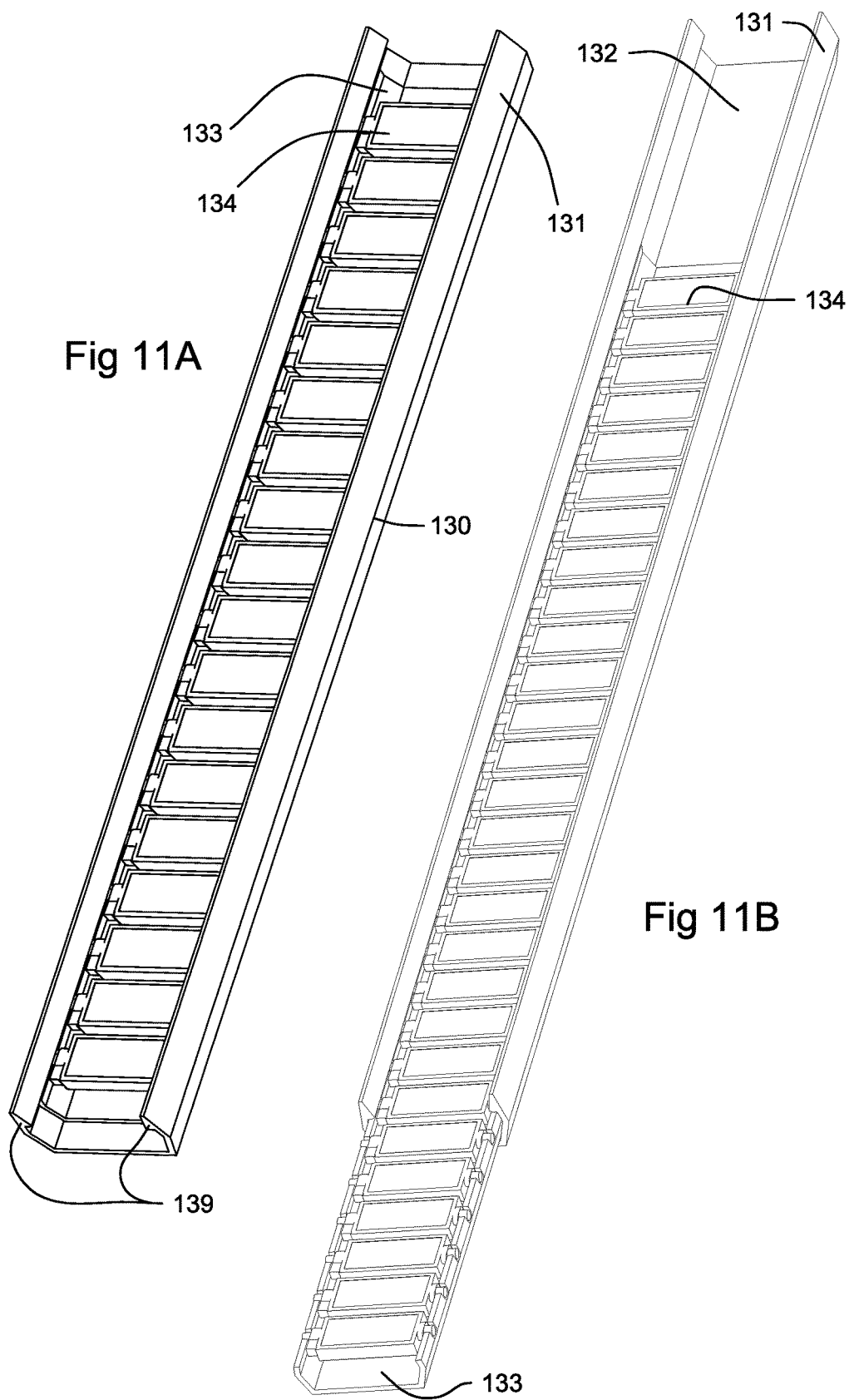

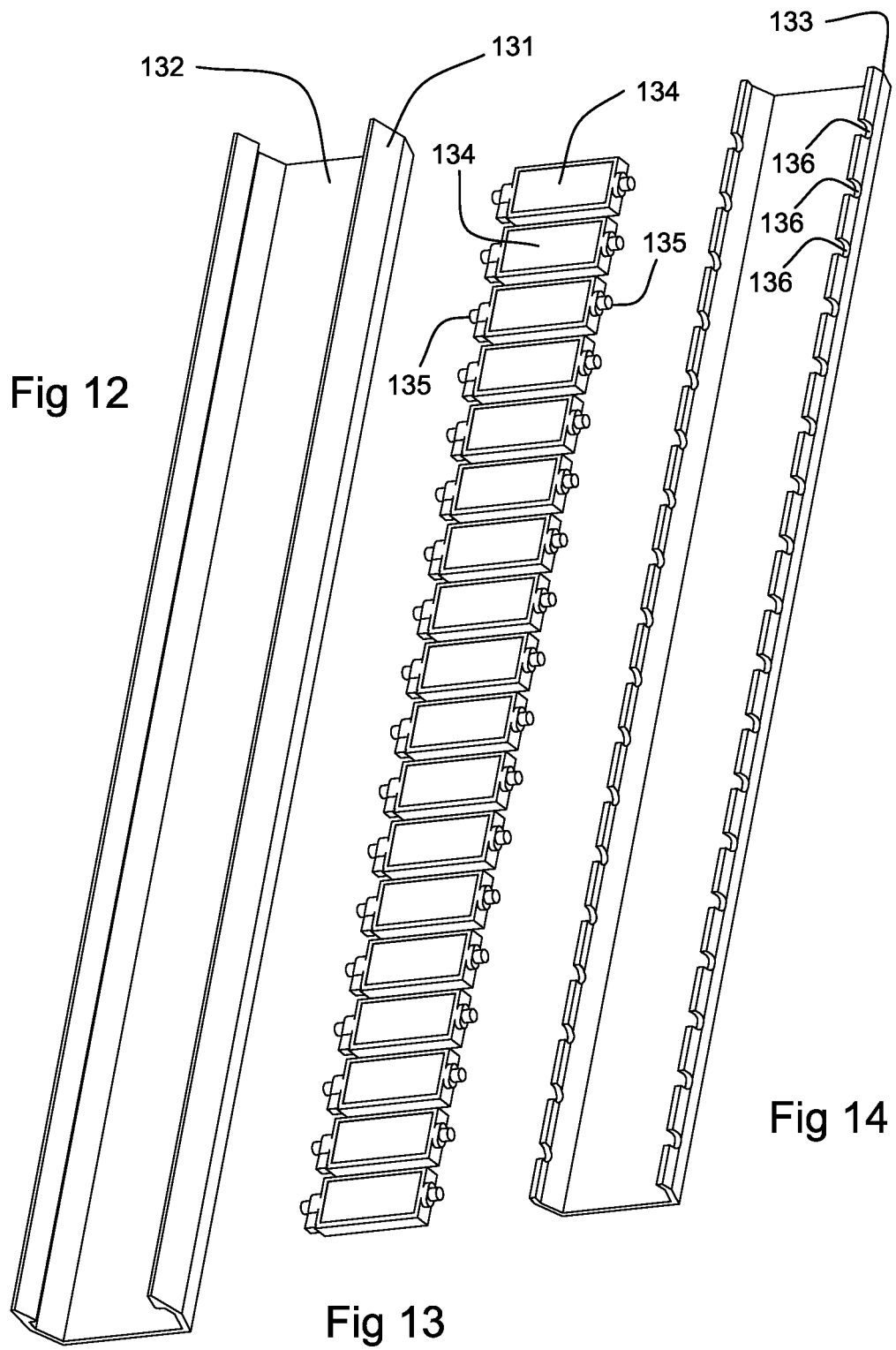

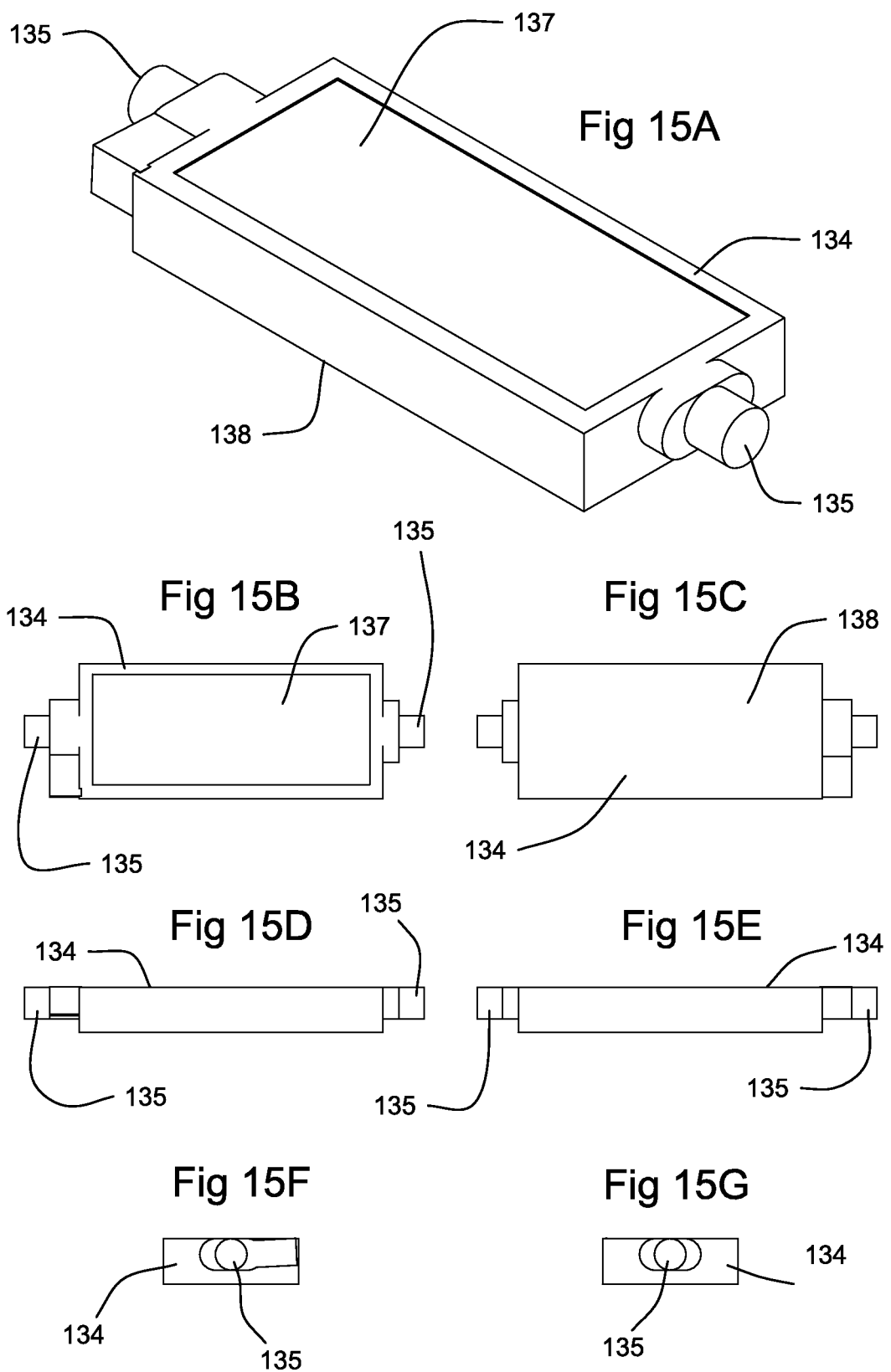

LEVEL INDICATOR SYSTEM

TECHNICAL FIELD

The present disclosure relates in general to apparatuses and devices for determining the level or depth of bodies of liquid, more particularly to a magnetically operated level indicator system and related apparatuses and devices.

BACKGROUND ART

Level gauges are often used to measure the fluid level of a tank or vessel, particularly in an industrial process environment. One such type of level gauge is a magnetic level indicator, which typically comprises a non-magnetic chamber, a float, and a visual level indicator. The chamber is typically a vertically mounted pipe that is connected to a tank or vessel by one or more pipes. Typically, one connecting pipe forms a connection between the top of the chamber and the top of the vessel and the other connecting pipe forms a connection between the bottom of the chamber and the bottom of the vessel. This arrangement permits the fluid level in the chamber to equalize with the fluid level in the tank. The float, as the name implies, floats at the surface of the fluid, rising and falling with the fluid. The float also contains one or more magnets for actuating the visual level indicator on the outside of the chamber.

Many visual level indicators comprise an elongated level indicator tube having a magnetically operated visual indicator sealed inside it. The magnetically operated visual indicator typically has a plurality of flags. The flags usually contain an alignment magnet that couples with the float magnet as the float moves up or down within the chamber. The movement of the float actuates the flags and changes their color to indicate the fluid level in the vessel. Typically, color is changed by causing the flags to rotate so opposing and differently colored sides are displayed.

In the prior art, the magnetically operated visual indicator is typically integral with the visual level indicator, i.e., the magnetically operated visual indicator typically cannot move within the elongated level indicator tube of the visual level indicator. This arrangement can be problematic because the magnetically operated visual indicator typically expands or contracts in response to temperature changes, which can cause the magnetically operated visual indicator to twist or flex. Such twisting or flexing can damage or deform the magnetically operated visual indicator, which can lead to process downtime. In addition, if the level gauge is non-functional or completely removed, then process safety issues can arise, e.g., overfilling of a tank, inadequate volume of a process fluid for an emergency cooling system, and so forth.

Prior art elongated level indicator tubes are typically sealed to keep condensation or other contaminants out of the housing. The tube is typically sealed along its circumference using traditional glassblowing techniques or a sealant (e.g., caulk, adhesive, plugs with o-rings, etc.). However, using traditional sealing or glassblowing techniques can be problematic because such techniques can weaken the integrity of the elongated level indicator tube making it more likely that the elongated level indicator tube could become damaged if it is twisted or flexed during assembly or use. Likewise, breakage during shipping and handling is more likely if the glass has been stressed.

Therefore, in view of the above, a need exists for an apparatus and method that can overcome one or more of the problems discussed above.

SUMMARY OF INVENTION

The purpose of the invention is to accomplish at least one of the following objects. An object of this invention is to provide an apparatus for measuring the fluid level in a vessel. A further object of this invention is to provide an apparatus that can seal the elongated level indicator tube of a level gauge. Additional objects and advantages of this invention shall become apparent from the ensuing descriptions of the invention.

According to a first aspect of the invention, a level indicator system is provided. The level indicator system includes a housing comprising a first material and an elongated level indicator tube comprising a second material, a magnetically operated visual indicator comprising a third material, and at least one plug configured to seal the elongated level indicator tube. The level indicator system is configured to prevent differences in the rate of temperature induced expansion or contraction from damaging the components of the level indicator system. The rate of expansion per degree of the second material will not typically be equal to the rate of expansion per degree of the first material, and the rate of expansion per degree of the third material will not typically be equal to the rate of expansion per degree of the second material.

According to a second aspect of the invention, a plug for a level indicator tube is provided. The plug includes an elongated body having a first end, a second end, and a port. The plug is configured to form one or more seals with the level indicator tube.

The above brief summary of the invention presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented below.

Additionally, the above brief summary has outlined rather broadly the features and technical advantages of the present invention in order that the detailed description of the invention that follows may be understood. Additional features and advantages of the invention will be described hereinafter, which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features, which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF DRAWINGS

The accompanying drawings illustrate various embodiments of this invention. However, it is to be understood that these embodiments are not intended to be exhaustive, nor limiting of the invention. These embodiments are but examples of some of the forms in which the invention may be practiced.

FIG. 1 is a perspective view of a level indicator according to this invention.

FIG. 2 is a front view of the level indicator shown in FIG. 1.

FIG. 3 is a rear view of the level indicator shown in FIG. 1.

FIG. 4 is a left view of the level indicator shown in FIG. 1.

FIG. 5 is a top view of the level indicator shown in FIG. 1.

FIG. 6 is a bottom view of the level indicator shown in FIG. 1.

FIG. 7 is a right view of the level indicator shown in FIG. 1.

FIGS. 9A-9H and 9J illustrate various views of an embodiment of a plug in accordance with this invention.

FIGS. 10A-10H and 10J illustrate various views of an embodiment of a plug in accordance with this invention.

FIG. 11A illustrates a magnetically operated visual indicator in accordance with this invention.

FIG. 11B illustrates a flag tray supporting a plurality of flags slidably interfacing with a channel of an elongated support.

FIG. 12 illustrates an elongated support for a magnetically operated visual indicator in accordance with this invention.

FIG. 13 illustrates a plurality of flags for a magnetically operated visual indicator in accordance with this invention.

FIG. 14 illustrates a flag tray for a magnetically operated visual indicator in accordance with this invention.

FIGS. 15A-15G illustrate various views of a flag for a magnetically operated visual indicator in accordance with this invention.

DESCRIPTION OF EMBODIMENTS

Figure 8:
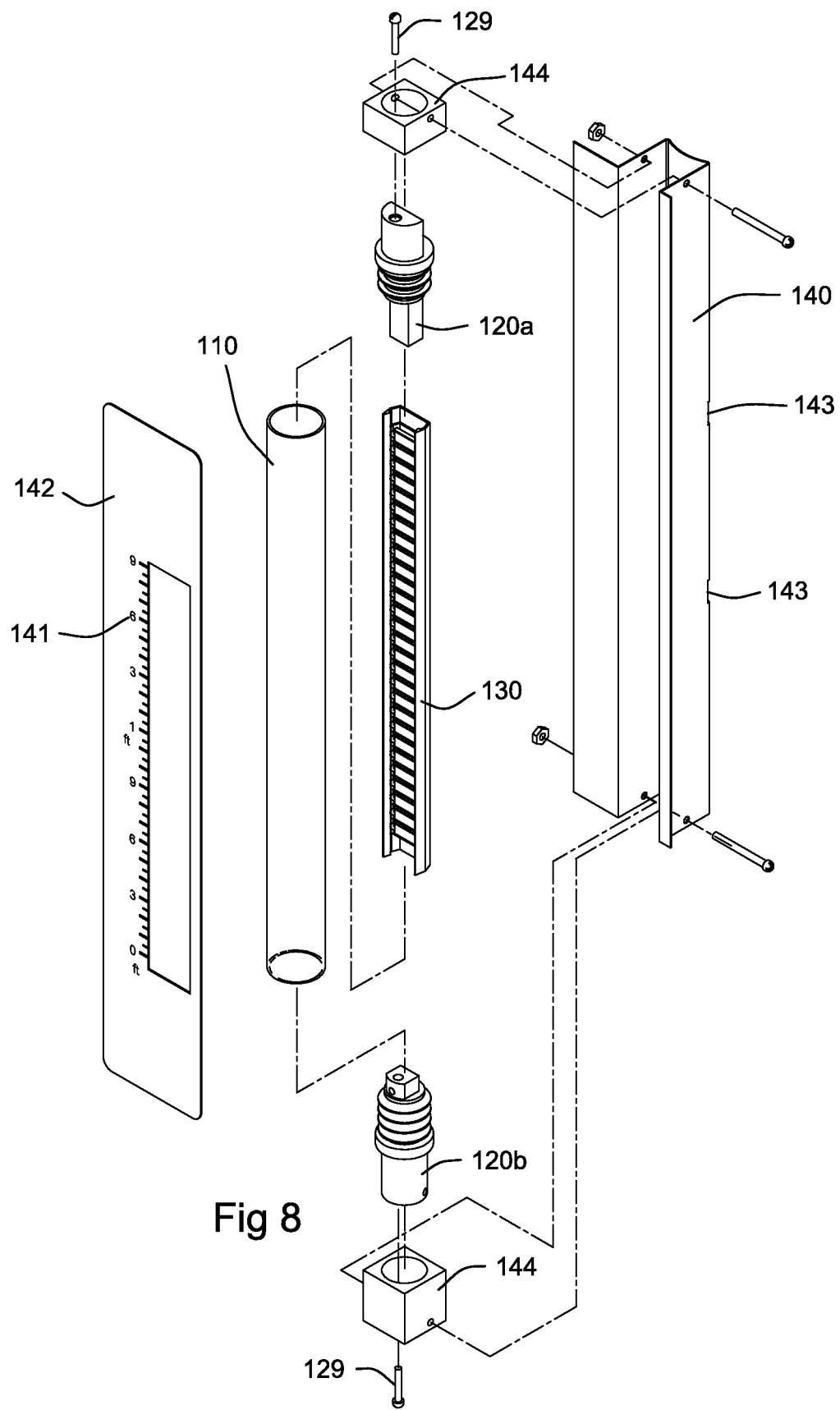
FIG. 8 is an exploded view of the level indicator shown in FIG. 1.

Without any intent to limit the scope of this invention, reference is made to the figures in describing the preferred embodiments of the invention. FIGS. 1-8 depict a level indicator system 100 in accordance with this invention. The level indicator system 100 comprises a housing 140 comprising a first material, an elongated level indicator tube 110 comprising a second material, a magnetically operated visual indicator 130 comprising a third material, and at least one plug 120a, 120b configured to seal the elongated level indicator tube. Commonly, the rate of expansion per degree of the second material is not equal to the rate of expansion per degree of the first material, and the rate of expansion per degree of the third material is not equal to the rate of expansion per degree of the second material. The rate of expansion per degree of the first material and the third material may or may not be the same.

The elongated level indicator tube 110 comprises a hollow, preferably cylindrical, tube. The elongated level indicator tube 110 is preferably sealed by two plugs 120a, 120b. However, in an alternate embodiment, one end of the elongated level indicator tube 110 can be sealed using the plug, and the other end of the elongated level indicator tube 110 can be sealed hermetically using traditional glassblowing or other sealing techniques. The elongated level indicator tube 110 may be constructed from any sufficiently strong material that is substantially transparent. An example of a suitable material for the elongated level indicator tube 110 is glass.

The level indicator system 100 can be secured within the housing 140. The housing 140 comprises indicia 141 corresponding to the liquid level of a fluid contained in a tank or vessel. The indicia 141 can be placed on a faceplate 142 that forms part of or is secured to the housing 140. The housing 140 can include one or more spacers 144 that connect the elongated level indicator tube 110 to the housing by a connection means. The connection means can be conventional means such as nut and bolt, screw, fastener, adhesive and so forth. The housing 140 may be constructed from any sufficiently strong material to protect the elongated level indicator tube 110. An example of a suitable material for the housing 140 is stainless steel.

The plug 120a, 120b comprises an elongated body 121 having a first end 122, a second end 123, and a port 124. The plug 120a, 120b has a central axis that extends longitudinally from the first end 122 to the second end 123. The elongated body 121 is configured to expand radially when subjected to a force that is substantially parallel to the central axis 121 and directed toward second end 123 and to contract radially when subjected to a parallel but opposite force.

In an embodiment, the elongated body 121 has one or more ribs 125 extending radially from the elongated body 121. Ribs 125 are slightly oversized relative to level indicator tube 110. By heating ribs 125 slightly, ribs 125 may be softened to facilitate insertion into and removal from level indicator tube 110. Each rib 125 is configured to expand radially when it is subjected to a force substantially parallel to the central axis and directed toward second end 123. The oversized nature of ribs 125 and the tendency of ribs 125 to expand upon application of pressure directed toward second end 123 creates at least one, and preferably a plurality of substantially airtight seals with the elongated level indicator tube 110.

A fluid, whether gas or liquid, impelled by differential pressure to enter or exit the level indicator tube 110 will exert a force substantially parallel to the central axis. If the pressure is greater outside level indicator tube 110 than inside, fluid pushed to enter level indicator tube 110, will cause at least the outmost rib 125 to expand radially to form or enhance a substantially airtight seal with the level indicator tube 110. Conversely, when the differential pressure impels a fluid inside level indicator tube 110 to exit level indicator tube 110, rib(s) 125 will contract radially, opening a passage for fluid to escape.

For example, when fluid in the elongated level indicator tube 110 is evacuated, the vacuum created will cause external fluids to exert a force on the plug 120a, 120b that is substantially parallel to the central axis and in the direction of second end 123. This will cause at least outermost rib 125 to expand radially to form or enhance a substantially airtight seal with the elongated level indicator tube 110.

If the pressure inside indicator tube 110 should exceed the external pressure for any reason, rib(s) 125 will contract, allowing fluid inside tube 110 to escape. In addition to serving to prevent or alleviate the concentration of moisture and other contaminants in indicator tube 110, the ability of ribs 125 to contract in the face of internal pressure functions as a safety feature. Differential pressure between the interior of indicator tube 110 and its exterior may cause tube 110 to fail. If the pressure is greater inside tube 110, such a failure could cause glass to be projected outward. The design of ribs 110 can help prevent significantly higher internal pressures from developing.

Inert gases, such as nitrogen, may be added to the elongated level indicator tube 110 to help prevent unwanted fluids such as water or humid air from entering tube 110. It will be appreciated, that if enough inert gas is added, the internal pressure of tube 110 may exceed the ambient pressure. Adding any gas to tube 110 at pressures that substantially exceed ambient pressure is not preferred. Doing so poses a failure risk to tube 110 of precisely the kind discussed above. The ability of ribs 125 to contract can allow excess gas inside tube 110 to escape, ameliorating the risk of failure. However, the ability of ribs 125 to contract also limits the use of positive internal pressure inside tube 110 to prevent undesirable fluids from entering. Beyond a certain point, adding extra inert gas to tube 110 is wasted effort, as the pressure will cause ribs 125 to contract and the excess gas to escape. Thus, if inert or other gas is intentionally added to tube 110, it is preferably not added substantially beyond ambient pressure.

The plug 120a, 120b can be constructed from any suitable material that is sufficiently flexible and that can maintain its structural integrity when subjected to heat, e.g., polytetrafluoroethylene (PTFE). When constructed in this manner, the plug 120a, 120b can be easily inserted into or removed from the elongated level indicator tube 110 when the plug 120a, 120b is subjected to heat, which can facilitate repair of the level indicator system 100.

As discussed above, the elongated body 121 of the plug 120a, 120b also includes a port 124, which is configured to permit the evacuation of a fluid from the elongated level indicator tube 110 or the addition of a fluid (e.g. an inert gas such as nitrogen) into the elongated level indicator tube 110. In an embodiment, the port 124 extends through the elongated body 121 from the first end 122 to the second end 123 of the plug 120a, 120b. To prevent fluid from entering or escaping the elongated level indicator tube 110, the port 124 may be closed using a seal 129 that is inserted into the port 124. The seal 129 may be any conventional means such as a screw, cover, waterproof filler or sealant, and so forth. The plug 120a, 120b can further comprise a stopper 126 configured to permit insertion of the plug 120a, 120b a predetermined distance into the elongated level indicator tube 110. The stopper 126 may form a seal with the end of the elongated level indicator tube 110.

The first end 122 of the elongated body 121 of the plug 120a, 120b is configured to secure the elongated level indicator tube 110 in position within the housing 140. In an embodiment shown in FIG. 10A-10H, the first end 122 of the elongated body 121 can comprise a protrusion 122a that is configured to substantially prevent rotation of the elongated level indicator tube 110 in the housing 140. The protrusion 122a can extend substantially parallel to the central axis of the plug 120a, 120b, and preferably has a substantially semi-circular cross section. The protrusion 122a can be offset from the central axis of the elongated level indicator tube 110 such that securing the protrusion 122a against radial motion will prevent the elongated level indicator tube 110 from rotating about its central axis.

As shown in FIG. 5, the protrusion 122a can be sized to mate with a correspondingly sized area of the spacer 144. The correspondingly sized area of the spacer can include an anti-rotational mechanism configured to permit linear movement of the elongated level indicator tube 110 within the housing while preventing the elongated level indicator tube 110 from rotating relative to the housing. The interaction between the protrusion 122a and the anti-rotational mechanism of the spacer 144 permits the housing 140 to expand or contract in response to temperature changes while preventing excessive tension on the elongated level indicator tube 110 or rotation of the elongated level indicator tube 110 in the housing 140. In a preferred embodiment, the anti-rotational mechanism abuts the protrusion 122a and extends through the correspondingly sized area of the spacer 144. The anti-rotational mechanism creates a slot within which protrusion 122a can slide linearly in response to the temperature induced expansion or contraction of the housing 140, but the interaction of the slot and protrusion 122a will preclude rotation of the elongated level indicator tube 110 relative to the housing 140. The anti-rotational mechanism can be any conventional means for preventing rotation including without limitation a bolt.

Figure 18:
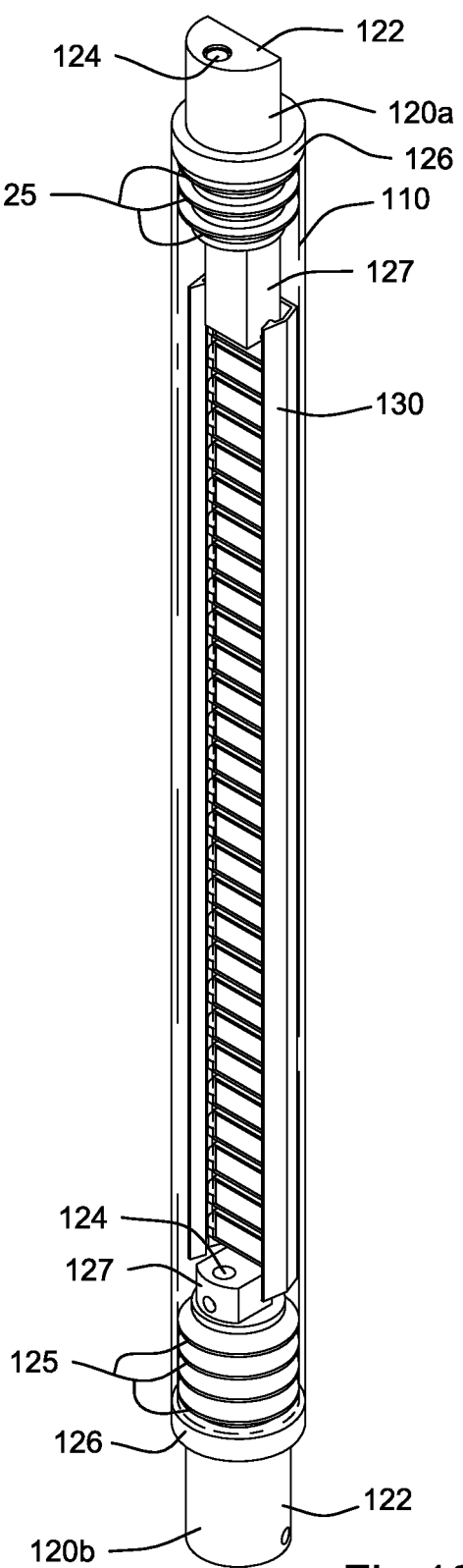
FIG. 18 illustrates an embodiment of an elongated level indicator tube having two plugs in accordance with this invention.

In an embodiment shown in FIG. 10A-10H, the second end 123 of the elongated body 121 can include finger-shaped retainer 127 that is sized and configured to extend a sufficient distance into the elongated level indicator tube 110 to position the magnetically operated visual indicator 130 within the elongated level indicator tube 110. In a preferred embodiment shown in FIG. 18, the finger-shaped retainer 127 has a substantially rectangular cross section and extends substantially parallel to the central axis of the plug 120a, 120b.

In some prior art indicators with the magnetically operated visual indicator integral to the housing (i.e., fixed to the housing at both ends), the magnetically operated visual indicator can become damaged in response to temperature changes that can cause the magnetically operated visual indicator to rotate or flex. This can cause the prior art visual indicators to bind, preventing them from turning in response to magnetic stimuli. Flexure of the prior art indicators can also cause them to move to an extent that they decouple from their magnetic stimuli so that the indicators do not move as the magnetic stimuli rise and fall.

The finger-shaped retainer 127 helps to allow the magnetically operated visual indicator 130 avoid deformation due to expansion or contraction in response to temperature changes. In particular, using the finger-shaped retainer 127 allows the magnetically operated visual indicator 130 to be held in a radial position relative to the elongated level indicator tube 110 without mechanically fixing the magnetically operated indicator 130 to the finger-shaped retainer 127. This configuration will allow the visual indicator 130 to expand or contract linearly without rotating within the elongated level indicator tube 110. In an embodiment shown in FIG. 9A-9H, the second end 120 of the elongated body 121 can also include a connection 128 configured to attach to the magnetically operated visual indicator 130 and prevent rotation of the magnetically operated visual indicator 130 within the elongated level indicator tube 110. The connection 128 can be a hole through which a screw passes through to facilitate the connection to the magnetically operated visual indicator 130. This configuration allows the orientation magnetically operated visual indicator 130 to be fixed without damaging or stressing the elongated level indicator tube 110.

The elongated level indicator tube 110 can further comprise an inert gas such as nitrogen. The inert gas is preferably added to the elongated level indicator tube 110 at or substantially near ambient pressure. Prior to adding the inert gas to the elongated level indicator tube 110, the elongated level indicator tube 110 should preferably be evacuated to remove fluid and other contaminants. The addition of the inert gas prevents unwanted fluids or contaminants from entering the elongated level indicator tube 110. Unwanted fluids or contaminants can make it difficult to determine the liquid level in a vessel or cause damage to the components of level indicator system 100. For example, if water enters the elongated level indicator tube 110, it can condense on the walls of the elongated level indicator tube 110 making it difficult for an operator in the field to read the magnetically operated visual indicator 130. Such readability issues can cause a variety of problems including without limitation process upsets and safety issues.

As illustrated in FIGS. 11A, 11B, and 12-14, the magnetically operated visual indicator 130 comprises an elongated support 131 having a longitudinally extending channel 132, and a flag tray 133 configured for supporting one or more flags 134. In an embodiment shown in FIG. 11B, the flags 134 are secured in position when the flag tray 133 slidably interfaces with the channel 132. The flag tray 133 is sized and shaped to slidingly fit within the channel 132 of the elongated support 131. The channel 132 is sized and shaped to correspond to that of the flag tray 133. The channel 132 can comprise one or more ridges 139 that are sized and shaped to secure the flag tray 133 in position. The magnetically operated visual indicator 130 may be constructed from any sufficiently strong non-magnetic material. An example of a suitable material for the magnetically operated visual indicator 130 is aluminum.

Each flag 134 comprises a set of pins 135 that extend from the flag 134 and are configured to fit within corresponding grooves 136 provided on the flag tray 133. Each flag 134 has a first face 137 having a first color and an opposite second face 138 having a second color. The second color is optically discernable from the first color, e.g., black and white, blue and red, black and yellow, and so forth.

The flags 134 further comprise a magnetic component, preferably a magnetized ceramic composite to permit the flags 134 to be actuated by a magnetic level float 220. In an embodiment, the magnetized ceramic composite comprises polyphenylene sulfide and strontium ferrite. The magnetized ceramic composite preferably comprises between about 26 to about 28 weight percent strontium ferrite, more preferably about 28 weight percent of strontium ferrite.

Figure 16:
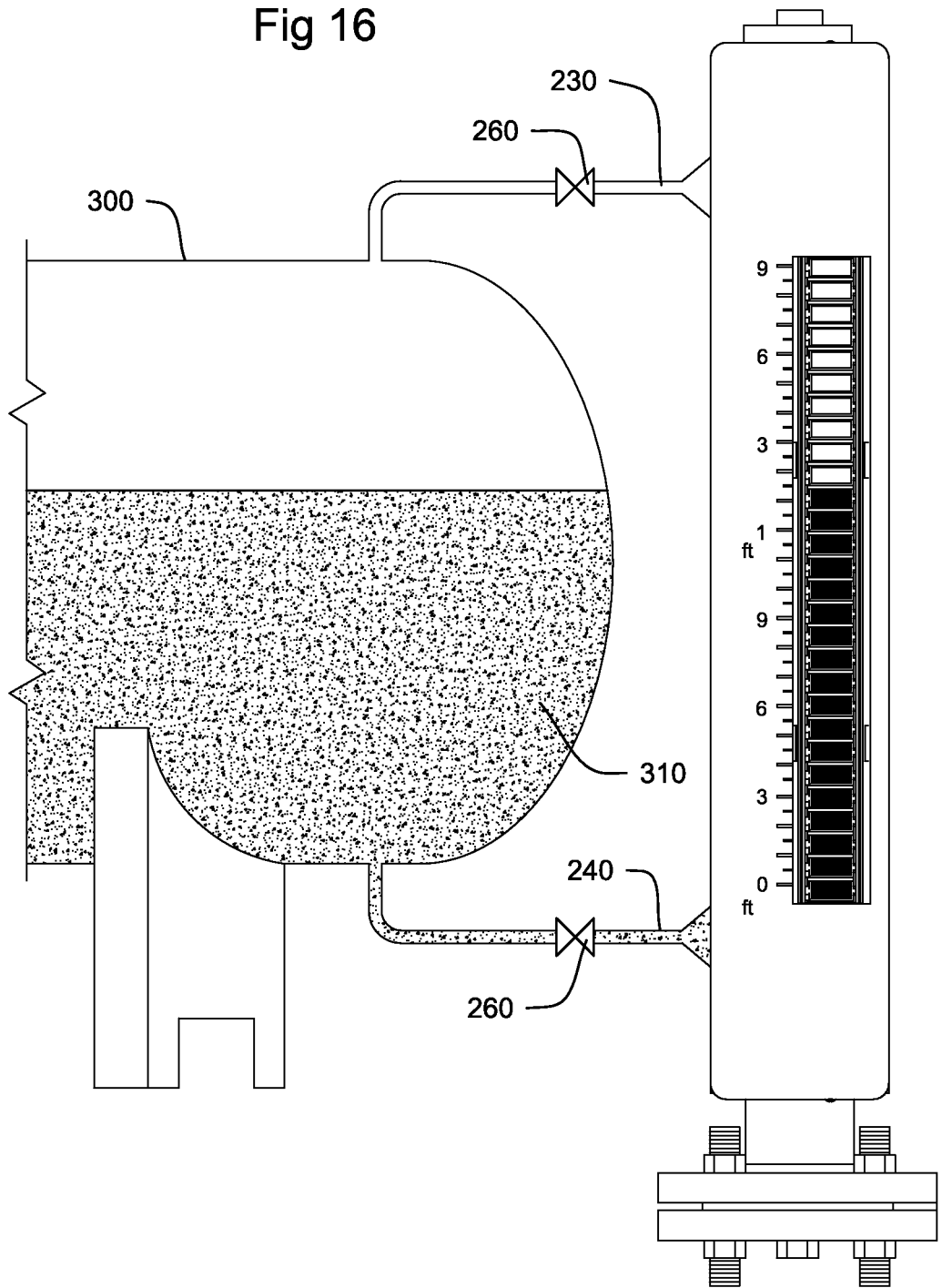
FIG. 16 illustrates a level indicator system in accordance with this invention in use with a tank. The level indicator system is shown oversized relative to the tank for illustration purposes.
Figure 17:
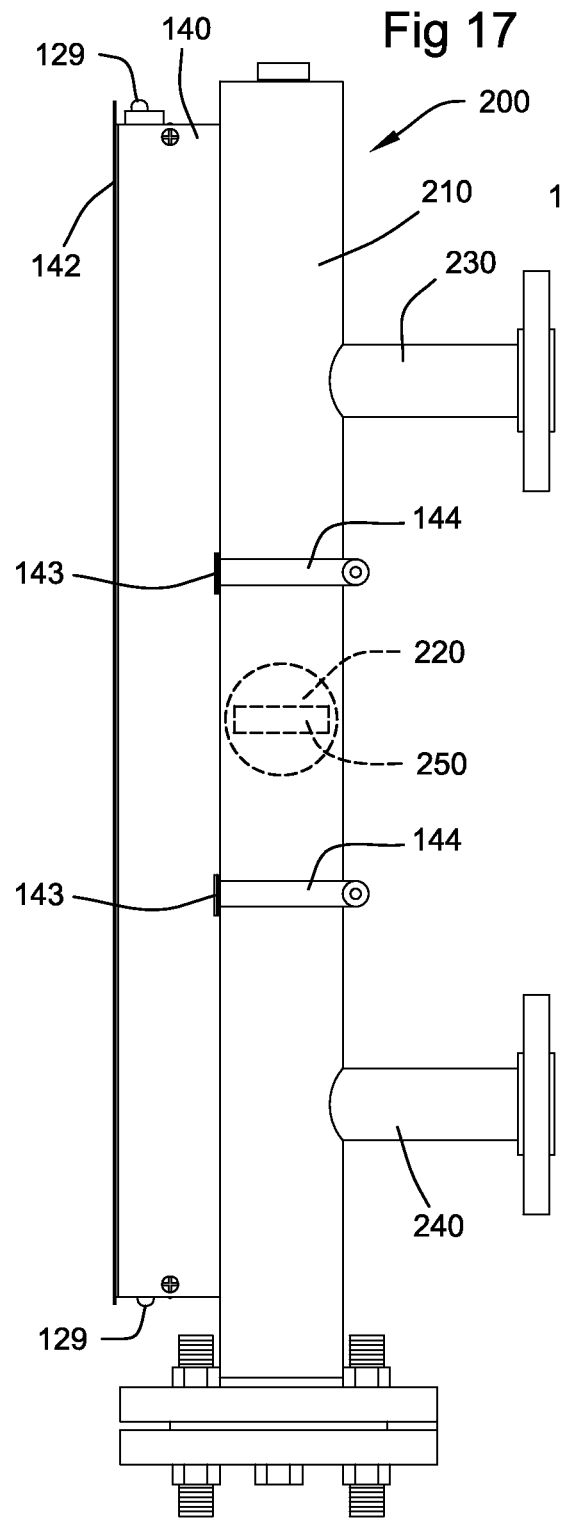
FIG. 17 illustrates a level indicator system in accordance with this invention in use with a magnetic level float.

As shown in FIG. 16 and FIG. 17, in operation, the level indicator system 100 is assembled by placing the pins 135 of the flag 134 into corresponding grooves 136 on the flag tray 133. Once the desired number of flags 134 are placed in the flag tray 133, the flag tray 133 is slidingly inserted into the channel 132 of the elongated support 131, which closes the grooves 136 to secure the flags 134 in position. The magnetically operated visual indicator 130 is inserted into the elongated level tube 110 and positioned within the elongated level tube 110 using the one or more plugs 120a, 120b. The magnetically operated visual indicator 130 and the one or more plug 120a, 120b are sized and positioned relative to each other to position the visual indicator within the elongated level indicator tube 110 when the plug 120a, 120b is positioned in the elongated level indicator tube 110. This configuration permits the magnetically operated visual indicator 130 to be non-integral to and removable from the elongated level indicator tube 110 of the level indicator system 100. By having a non-integral and removable magnetically operated visual indicator 130, the magnetically operated visual indicator 130 may expand or contract in response to temperature changes without tension or compression being applied to the magnetically operated visual indicator 130. In particular, the finger-shaped retainer 127 allows the magnetically operated visual indicator 130 to be held in a radial position relative to the elongated level indicator tube 110 without mechanically fixing the magnetically operated indicator 130 to the finger-shaped retainer 127. This arrangement prevents damage to the magnetically operated visual indicator 130 as a result of temperature change.

The one or more plugs 120a, 120b are heated and inserted into each end of the elongated level indicator tube 110. Heating softens the one or more plugs 120a, 120b, which permits the plugs to be easily inserted into the elongated level indicator tube 100 and to conform to the inner walls of the elongated level indicator tub 110, which forms one or more substantially airtight seals with an inner wall of the elongated level indicator tube 110. The one or more plugs 120a, 120b are permitted to cool which sets the one or more plugs 120a, 120b in position in the elongated level indicator tube 110. The elongated level indicator tube 110 is evacuated and may be filled with an inert gas at or substantially near ambient pressure through the port 124. The port 124 of the one or more plugs 120a, 120b can then be sealed. In a preferred embodiment, this is done by threading a screw into the port 124.

The liquid level system 100 is secured within a housing 140 by inserting the one more plugs 120a, 120b into a correspondingly sized area of the spacer 144. As shown in FIG. 5, the protrusion 122a mates with a correspondingly sized area of the spacer 144. The anti-rotational mechanism abuts the protrusion 122a, which permits linear movement of the housing 140 relative to the elongated level indicator tube 110 while preventing the elongated level indicator tube 110 from rotating relative to housing 140. This arrangement permits the housing 140 to expand or contract in response to temperature changes while preventing excessive tension or compression on the elongated level indicator tube 110 or rotation of the elongated level indicator tube 110 in the housing 140.

The liquid level system 100 is mounted to a non-magnetic chamber 200 that is connected to a tank or vessel 300 containing fluid 310. The liquid level system 100 is mounted to the non-magnetic chamber 200 by any conventional mounting means 144. In an embodiment, the mounting means 144 can include straps secured to connection points 143 on the housing 140. The non-magnetic chamber 200 typically comprises a vertically mounted pipe 210 that is connected to the tank or vessel 300 by at least one and preferably two or more substantially horizontal pipes 230, 240. The vertically mounted pipe 210 contains a float 240. The connecting pipes 230, 240 can include a valve 260 to permit the non-magnetic chamber 200 to be isolated from the tank or vessel 300. One connecting pipe 230 forms a fluid connection between the top of the non-magnetic chamber 200 and the top of the tank or vessel 300 or the atmosphere and the other connecting pipe 240 forms a fluid connection between the bottom of the non-magnetic chamber 200 and the bottom of the tank or vessel 300. This arrangement permits the fluid level in the non-magnetic chamber 200 to equalize with the fluid level in the tank or vessel 300. The size and weight of the float 240 is based on the specific gravity, temperature and pressure of the application. The float 240 also contains one or more magnets 250 for actuating magnetically operated visual indicator 130 on the level indicator system 100.

As the tank liquid level increases, the float 220 rises within the non-magnetic chamber 200 thereby actuating the flags 134. When each flag 134 is actuated by the magnetic float 220, the first face 137 of the flag flips to the second face 138, which reveals a color optically discernable from the first face (e.g., black and white, blue and red, black and yellow, and so forth). Similarly, as the tank liquid level decreases, the float 220 falls within the non-magnetic chamber 200 thereby actuating the flags 134. When each flag 134 is actuated by the magnetic float 220, the second face 138 of the flag flips to the first face 137, which reveals a color optically discernable from the second face. In this manner, a field operator can visually determine the liquid level of the tank or vessel 300.

In most cases, if the level indicator system 100 is damaged (e.g., broken elongated level indicator tube, failed seal, damaged flag, etc.), then the damaged elongated level indicator tube 110 can be removed from the housing 140 and replaced with a new elongated level indicator tube 110. However, in some limited cases such as large level indicator systems where repair in the field is desired, the level indicator system 100 can be repaired in the field by heating and removing the one or more plugs 120a, 120b from the elongated level indicator tube 110. The magnetically operated visual indicator 130 may then be removed, repaired or replaced, and returned to the elongated level indicator tube 110. The one or more plugs 120a, 120b can also be heated and easily re-inserted into the elongated level indicator tube 110, which forms one or more substantially airtight seals with an inner wall of the elongated level indicator tube 110. As the one or more plugs 120a, 120b cool, they harden, which sets the plug in position in the elongated level indicator tube 110. The one or more plugs can then be evacuated and filled with an inert gas through the port 124. In this manner, level indicator system can be repaired in the field without having to completely remove it from service.

Any reference to patents, documents and other writings contained herein shall not be construed as an admission as to their status with respect to being or not being prior art. Although the present invention and its advantages have been described in detail, it is understood that the array of features and embodiments taught herein may be combined and rearranged in a large number of additional combinations not directly disclosed, as will be apparent to one having ordinary skill in the art. The invention disclosed herein may be practiced in the absence of any element which is not specifically disclosed herein. It should be understood that various changes, substitutions and alterations can be made herein without departing from the spirit and scope of the invention as defined by the following claims. There are, of course, other embodiments, which are alternatives to the foregoing descriptions of the invention, which are intended to be included within the scope of the invention, as defined by the following claims.

What is claimed is:

1. A level indicator system comprising:
   a. a housing comprising a first material having a temperature dependent rate of expansion;
   b. an elongated level indicator tube comprising a second material having a temperature dependent rate of expansion, wherein the rate of expansion of the second material is not equal to the rate of expansion of the first material;
   c. a magnetically operated visual indicator within the elongated level indicator tube, the magnetically operated visual indicator comprising a third material having a temperature dependent rate of expansion, wherein the rate of expansion of the third material is not equal to the rate of expansion of the second material; and,
   d. at least one plug configured to seal the elongated level indicator tube.

2. The level indicator system of claim 1 wherein the plug is configured to substantially prevent rotation of the elongated level indicator tube relative to the housing.

3. The level indicator system of claim 2 wherein the plug and the housing are configured to allow the housing to expand or contract linearly relative to the elongated level indicator tube.

4. The level indicator system of claim 3 wherein the plug is configured to substantially prevent rotation of the magnetically operated visual indicator relative to the elongated level indicator tube.

5. The level indicator system of claim 4 wherein the plug is configured to allow the magnetically operated visual indicator to expand and contract linearly relative to the tube.

6. The level indicator system of claim 5 wherein the plug comprises an elongated body, the elongated body comprising:
   a. a first end;
   b. a second end; and,
   c. a port;
   wherein the plug is configured to form a seal with the level indicator tube when the second end is placed within the level indicator tube.

7. The level indicator system of claim 6 wherein the elongated body further comprises at least one rib that is configured to expand radially when subjected to a force that is substantially parallel to a central axis that extends from the first end to the second end and in the direction of the second end whereby said seal will be formed between the plug and the level indicator tube.

8. The level indicator system of claim 7 wherein the first end of the plug is configured to substantially prevent rotation of the elongated level indicator tube relative to the housing.

9. The level indicator system of claim 8 wherein the first end includes a protrusion that extends substantially parallel to the central axis.

10. The level indicator system of claim 9 wherein the protrusion has a substantially semi-circular cross section.

11. The level indicatory system of claim 10 wherein the second end of the plug is configured to substantially prevent rotation of the magnetically operated visual indicator relative to the elongated level indicator tube.

12. The level indicator system of claim 11 wherein the second end includes a retainer that extends substantially parallel to a central axis of the plug.

13. The level indicator system of claim 12 wherein the retainer has a substantially rectangular cross section.

14. The level indicator system of claim 10 wherein the plug is configured to permit evacuation of the elongated level indicator tube.

15. The level indicator system of claim 14 wherein the plug is configured to permit the elongated level indicator tube to be filled with an inert gas.

16. The level indicator system of claim 15 wherein the magnetically operated visual indicator comprises:
   a. an elongated support having a channel; and b. a flag tray supporting a plurality of flags, wherein the flags are held in position when the flag tray slidably interfaces with the channel.

17. The level indicator system of claim 16 wherein flags are formed from a magnetic component.

18. The level indicator system of claim 17 wherein the magnetic component is a magnetized ceramic composite comprising:
   a. polyphenylene sulfide; and
   b. strontium ferrite.

19. The level indicator system of claim 18 wherein the magnetized ceramic composite comprises between about 26 to about 28 weight percent of strontium ferrite.

20. The level indicator system of claim 19 wherein the magnetized ceramic composite comprises about 28 weight percent of strontium ferrite.

21. The level indicator system of claim 20 wherein the magnetically operated visual indicator is non-integral to the elongated level indicator tube of the level indicator system.

22. The level indicator system of claim 21 wherein the flag tray is sized and shaped to slidingly fit within the correspondingly sized and shaped channel of the elongated support.

23. The level indicator system of claim 22 further comprising a float configured to actuate the magnetically operated visual indicator.

24. The level indicator system of claim 7 wherein the rib is configured to contract radially when subjected to a force that is substantially parallel to the and in the direction of the first end thereby permitting fluid inside the elongated level indicator tube to escape.

25. A plug for a level indicator tube, the plug comprising:
   a. an elongated body comprising:
      i. a first end;
      ii. a second end; and
      iii. a port;
      iv. at least one rib configured to expand radially when subjected to a force that is substantially parallel to a central axis that extends from the first end to the second end and in the direction of the second end;
   wherein the plug is configured to form a seal between the plug and the level indicator tube when the second end is placed in the level indicator tube.

26. The plug of claim 25 wherein the rib extends radially from the elongated body.

27. The plug of claim 26 wherein the elongated body further comprises a stopper configured to permit the insertion of the plug a pre-determined distance into the level indicator tube.

28. The plug of claim 26 wherein the port is configured to permit the evacuation of a fluid from the level indicator tube.

29. The plug of claim 28 wherein the port extends through the elongated body from the first end to the second end.

30. The plug of claim 29 wherein the plug is configured to allow linear expansion and contraction of the housing relative to the elongated level indicator tube.

31. The plug of claim 30 wherein the first end includes a protrusion that extends substantially parallel to the central axis.

32. The plug of claim 31 wherein the protrusion has a substantially semi-circular cross section.

33. The plug of claim 30 wherein the second end is configured to position a visual indicator within the level indicator tube.

34. The plug of claim 33 wherein the second end includes a retainer that extends substantially parallel to a central axis of the plug.

35. The plug of claim 34 wherein the retainer has a substantially rectangular cross section.

36. The plug of claim 35 wherein the plug comprises polytetrafluoroethylene.

37. The plug of claim 33 wherein the plug is configured to substantially preclude rotation of the visual indicator relative to the elongated level indicator tube.

38. The plug of claim 37 wherein the plug is configured to allow the visual indicator to expand or contract linearly relative to the elongated level indicator tube.

39. The plug of claim 25 wherein the first end is configured to prevent rotation of the level indicator tube relative to a housing.

40. The plug of claim 25 wherein the rib is configured to contract radially when subjected to a force that is substantially parallel to the and in the direction of the first end thereby permitting fluid inside the elongated level indicator tube to escape.

* * * * *